(12) United States Patent
Mikami

(10) Patent No.: US 6,445,687 B1
(45) Date of Patent: Sep. 3, 2002

(54) GROUP COMMUNICATION SYSTEM

(75) Inventor: Hiroshi Mikami, Kanagawa (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/092,648

(22) Filed: Jun. 9, 1998

(30) Foreign Application Priority Data

Jun. 9, 1997 (JP) .............................................. 9-150635

(51) Int. Cl.⁷ ................................................ H04Q 7/00
(52) U.S. Cl. ...................... 370/328; 370/329; 455/11.1; 455/509
(58) Field of Search ................................ 370/328, 329, 370/320, 321, 331, 335, 346, 431, 348, 432, 433; 455/426, 509, 516, 517, 518, 519, 515

(56) References Cited

U.S. PATENT DOCUMENTS

| | | | |
|---|---|---|---|
| 5,420,574 A | * 5/1995 | Erickson | 370/341 |
| 5,612,955 A | * 3/1997 | Fernandez | 370/433 |
| 5,857,144 A | * 1/1999 | Mangum | 455/11.1 |
| 5,983,099 A | * 11/1999 | Yao | 455/426 |
| 6,091,959 A | * 6/2000 | Soussi | 455/456 |
| H1941 H | * 2/2001 | Hoffpauir | 379/265 |
| 6,233,461 B1 | * 5/2001 | Chinitz | 455/422 |
| 6,252,859 B1 | * 6/2001 | Rhodes | 370/329 |

FOREIGN PATENT DOCUMENTS

GB  2 271 690 A  4/1994

* cited by examiner

Primary Examiner—Douglas Olms
Assistant Examiner—Ricardo M. Pizarro
(74) Attorney, Agent, or Firm—Foley & Lardner

(57) ABSTRACT

A group communication system is disclosed, that comprises at least one controlling station, at least one base station connected to the controlling station through a wired circuit or a radio circuit, and a plurality of mobile stations connected to the base station, wherein the controlling station or the base station has a means for managing group communication numbers of the mobile stations, wherein the mobile stations each have a means for transmitting a mobile station identification number and a group communication number to the base station when a radio zone of each of the mobile stations is handed over and thereby a location registration operation is performed, wherein the controlling station or the base station has a zone area presence determining means for determining whether or not a particular mobile station is present in a radio zone to which the particular mobile station has been handed over when the controlling station or the base station receives the group communication number from the relevant mobile station, and wherein the base station has a means for releasing a communication channel when the relevant mobile station is not present in the radio zone as the determined result of the zone area presence determining means.

41 Claims, 5 Drawing Sheets

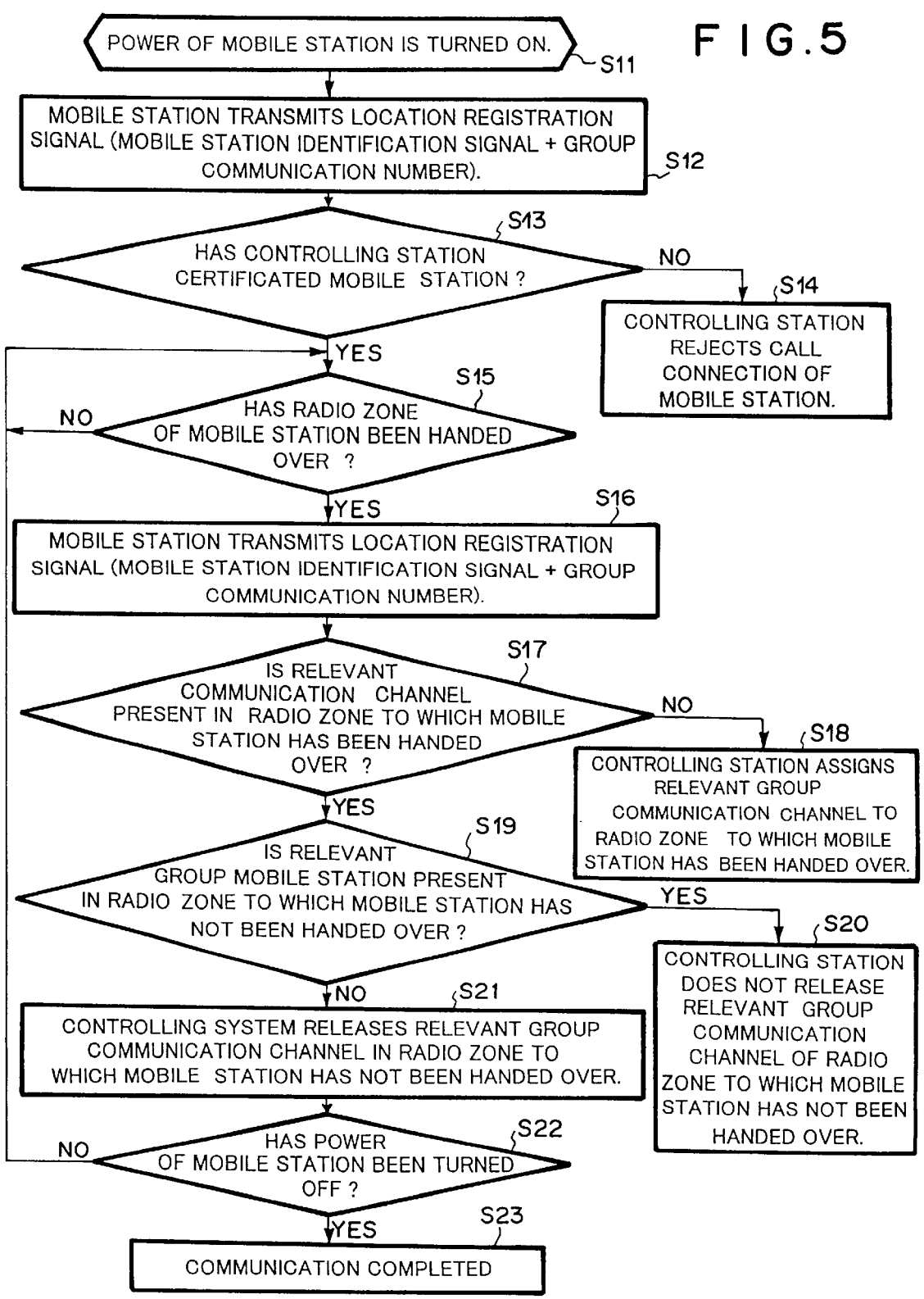

GROUP COMMUNICATION SYSTEM

BACKGROUND OF THE INVENTION

1. Field of the Invention

The present invention relates to a group communication system as a multi-channel access type mobile communication system.

2. Description of the Related Art

A group communication system as a conventional multi-channel access type mobile communication system has been disclosed in Japanese Patent Laid-Open Publication No. Hei 7-30479. According to the related art reference, in a mobile telephone system, a calling party does not directly dial a called party. Instead, a subscriber (called party) with a particular group user radio unit of which the locations of a plurality of called parties have been registered to a mobile communication service center and they are in call receivable state is selected. Calls for connecting with a group communication system are connected with different frequencies. Thus, the frequency use ratio in this system is low.

As another related art reference, in a conventional group communication system that covers a plurality of radio zones, regardless of whether or not mobile stations with relevant group communication numbers are present in a particular radio zone, communication channels are assigned to a radio zone of a base station corresponding to the group communication numbers. Thus, the frequency use efficiency in this system is also low.

In the above-mentioned group communication system, since communication channels are assigned to a radio zone of a base station corresponding to individual group communication numbers, even if a mobile station is not present in an old radio zone due to a hand-over, a communication channel is still assigned to the old radio zone. Thus, the frequency use efficiency is low.

SUMMARY OF THE INVENTION

Therefore, an object of the present invention is to provide a group communication system that allows a communication channel assigned to a radio zone to be released in the case that a group communication mobile station is not present in a group communication radio zone so as to improve the frequency use ratio.

To accomplish the above-described object, a group communication system according to the present invention comprises at least one controlling station, at least one base station connected to the controlling station through a wired circuit or a radio circuit, and a plurality of mobile stations connected to the base station, wherein the controlling station or the base station has a means for managing group communication numbers of the mobile stations, wherein the mobile stations each have a means for transmitting a mobile station identification number and a group communication number to the base station when a radio zone of each of the mobile stations is handed over and thereby a location registration operation is performed, wherein the controlling station or the base station has a zone area presence determining means for determining whether or not a particular mobile station is present in a radio zone to which the particular mobile station has been handed over when the controlling station or the base station receives the group communication number from the relevant mobile station, and wherein the base station has a means for releasing a communication channel when the relevant mobile station is not present in the radio zone as the determined result of the zone area presence determining means.

A link line for connecting the controlling station and the base station is preferably provided.

The controlling station is preferably connected to a telephone unit.

The base station and the mobile stations are preferably connected through radio circuits.

The controlling station preferably comprises a controlling portion for connecting the controlling station to the base station, a location registration register portion for registering a location registration signal when the power of the relevant mobile station is turned on or when the radio zone thereof is handed over, and a switching portion for establishing a communication circuit between the relevant mobile station and the wired circuit or the radio circuit through the base station or a communication circuit between the mobile stations.

The location registration register preferably retrieves communication information of the relevant mobile station and certificates whether or not the relevant mobile station has been registered.

The controlling portion is preferably connected to the location registration register portion and the switching portion.

The base station preferably comprises a controlling portion connected to the controlling portion of the controlling station, a control channel transmitting/receiving portion connected to the location registration register portion of the controlling station, and a transmitting/receiving unit with plurality of communication channels.

The control channel transmitting/receiving unit preferably controls the mobile stations.

According to the present invention, in a group communication system comprising at least one controlling station, at least one base station connected to the controlling station through a wired circuit or a radio circuit, and a plurality of mobile stations connected to the base station, wherein the controlling station or the base station has a function for managing group communication numbers of the mobile stations, wherein the mobile stations each have a function for transmitting a mobile station identification number and a group communication number to the base station when a radio zone of each of the mobile stations is handed over and thereby a location registration operation is performed, wherein the controlling station or the base station determines whether or not a particular mobile station is present in a radio zone to which the particular mobile station has been handed over when the controlling station or the base station receives the group communication number from the relevant mobile station, and wherein the base station releases a communication channel when the relevant mobile station is not present in the radio zone as the determined result.

The group-communication group-number management register disposed in the controlling station or the base station manages group communication calls and collates them with group communication numbers as information of location registration signals transmitted from mobile stations.

In addition, since the group-communication group-number management register disposed in the controlling station or the base station can manage group communication calls, it can determine whether or not a particular mobile station that can be moved in a plurality of radio zones is present in the radio zone of the controlling station or the base station. Thus, the controlling station or the base station does not assign a radio channel to a radio zone in which a group communication mobile station is not present.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 5 is a flow chart for explaining the operation of the controlling station in the group communication system according to the present invention.

DESCRIPTION OF PREFERRED EMBODIMENT

Next, with reference to the accompanying drawings, an embodiment of the present invention will be described. Further, the embodiment is stated mainly about handed-over on behalf of roaming for different providers.

Figure 1:
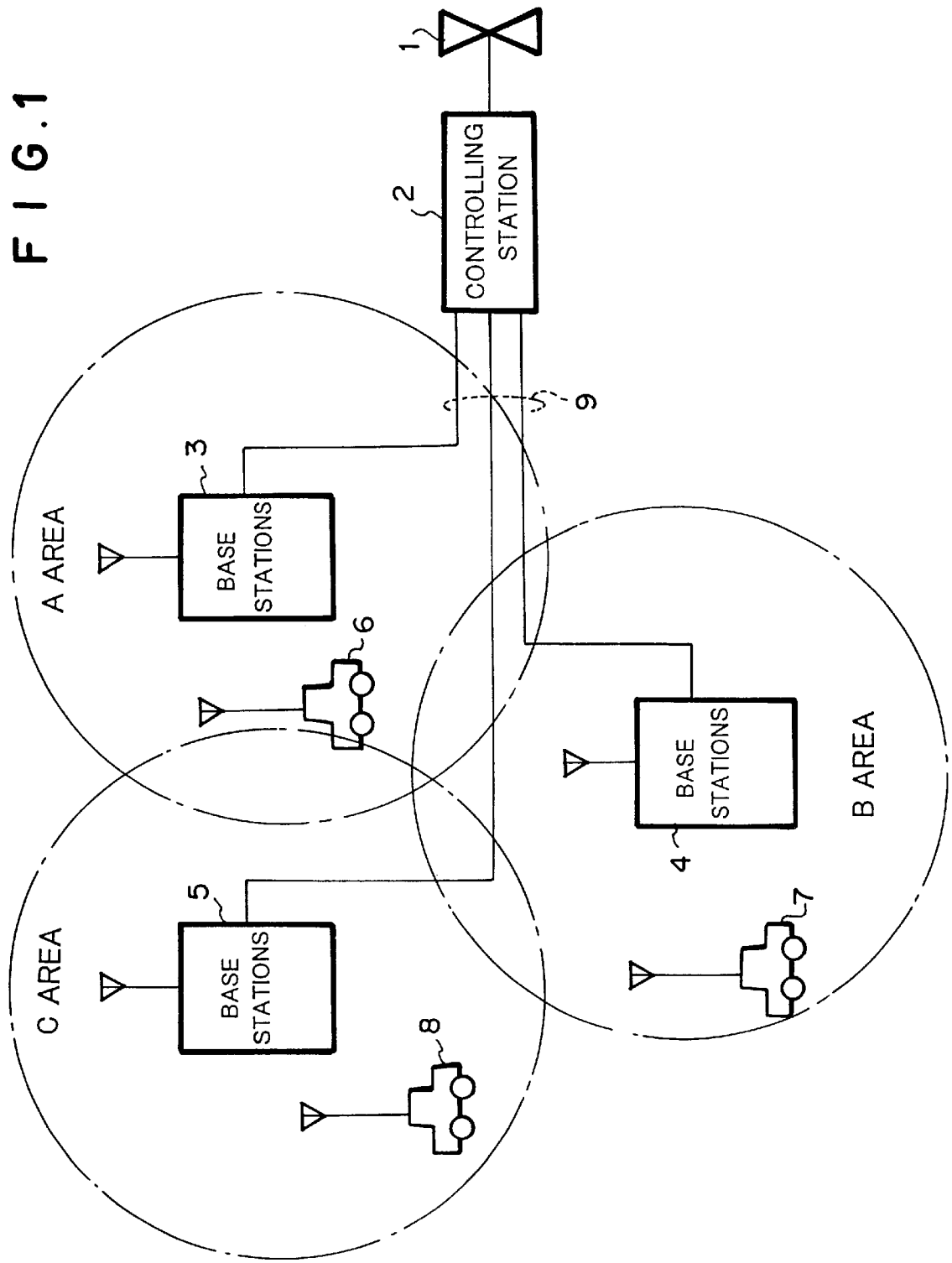
FIG. 1 is a block diagram showing the structure of a group communication system according to an embodiment of the present invention.

FIG. 1 is a block diagram showing the structure of a group communication system according to an embodiment of the present invention. A controlling station 2 is connected to base stations 3, 4, 5 in areas A, B, and C with respective link lines 9. In addition, the controlling station 2 is connected to a telephone unit 1 through a public telephone network. Moreover, the base stations 3, 4, and 5 are connected to mobile stations 6, 7, and 8 with radio circuits, respectively.

Figure 2:
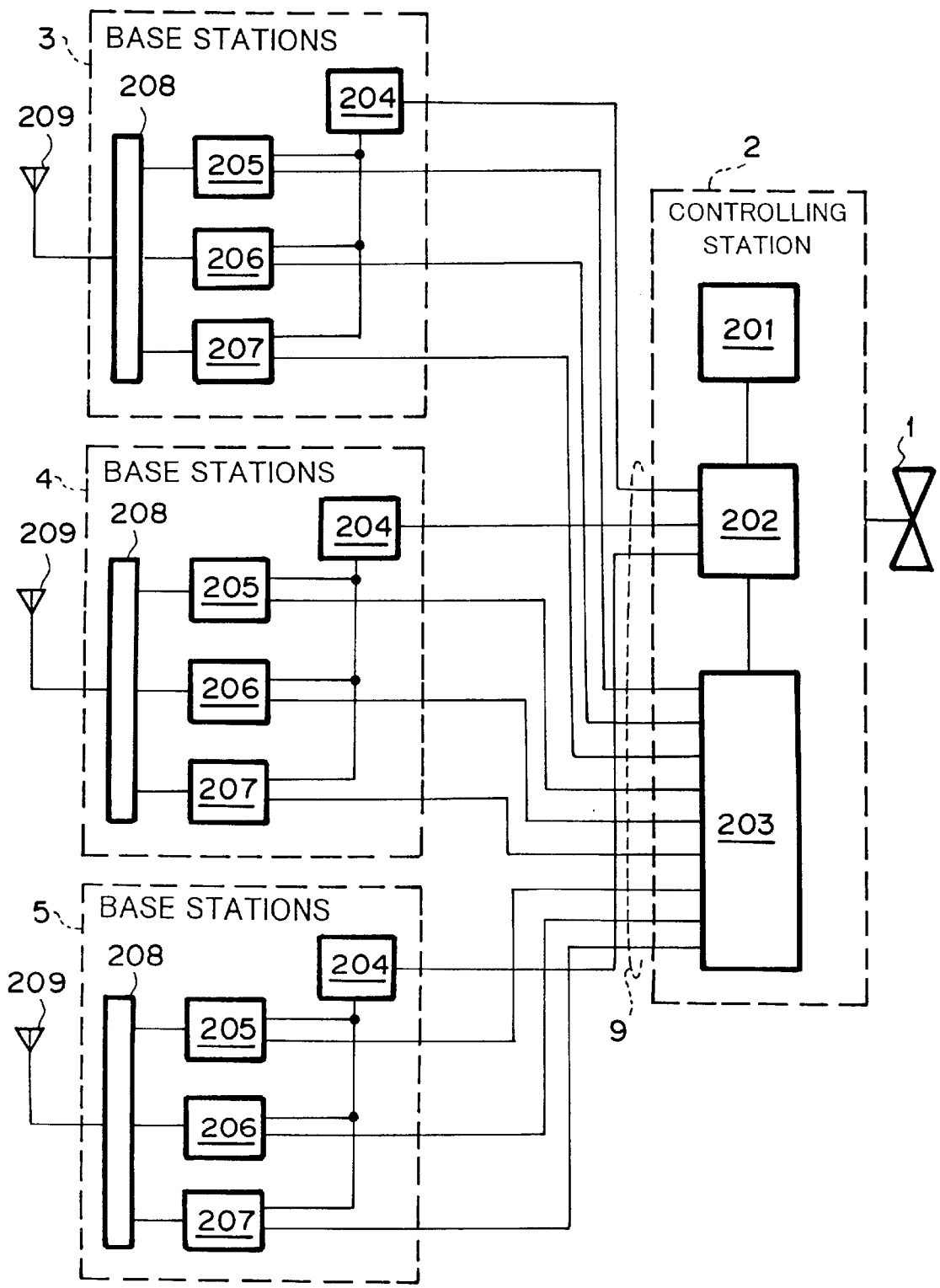
FIG. 2 is a block diagram showing the structure of a base station and a controlling station according to the present invention.

FIG. 2 is a block diagram showing the structures of the controlling station 2 and the base stations 3, 4, and 5. In the controlling station 2, a controlling portion 202 is connected to a location registration register portion 201 and a switching portion 203. The controlling portion 202 is connected to controlling portions 204 in the base stations 3, 4, and 5 with the link lines 9, respectively, so that the controlling portion 202 controls the base stations 3, 4, and 5 and the mobile stations 6, 7, and 8 through control channel transmitting/receiving units 205 of the base stations 3, 4, and 5, respectively. The switching portion 203 establishes communication circuits from the mobile stations 6, 7, and 8 to the telephone unit 1 through the transmitting/receiving portions 206 and 207 of the base stations 3, 4, and 5 through the link lines 9. In addition, the switching portion 203 establishes communication circuits from the mobile stations 6, 7, and 8 to other mobile stations through other transmitting/receiving portions. When the powers of the mobile stations 6, 7, and 8 are turned on or when a location registration signal is registered to the location registration register portion 201 in the hand-over state or the like, the location registration register portion 201 certificates whether or not the mobile stations 6, 7, and 8 have been registered to the system. In addition, the location registration register portion 201 retrieves communication information of the mobile stations. An antenna common portion 208 is shared with a plurality of transmitting/receiving portions for an antenna 209.

Figure 3:
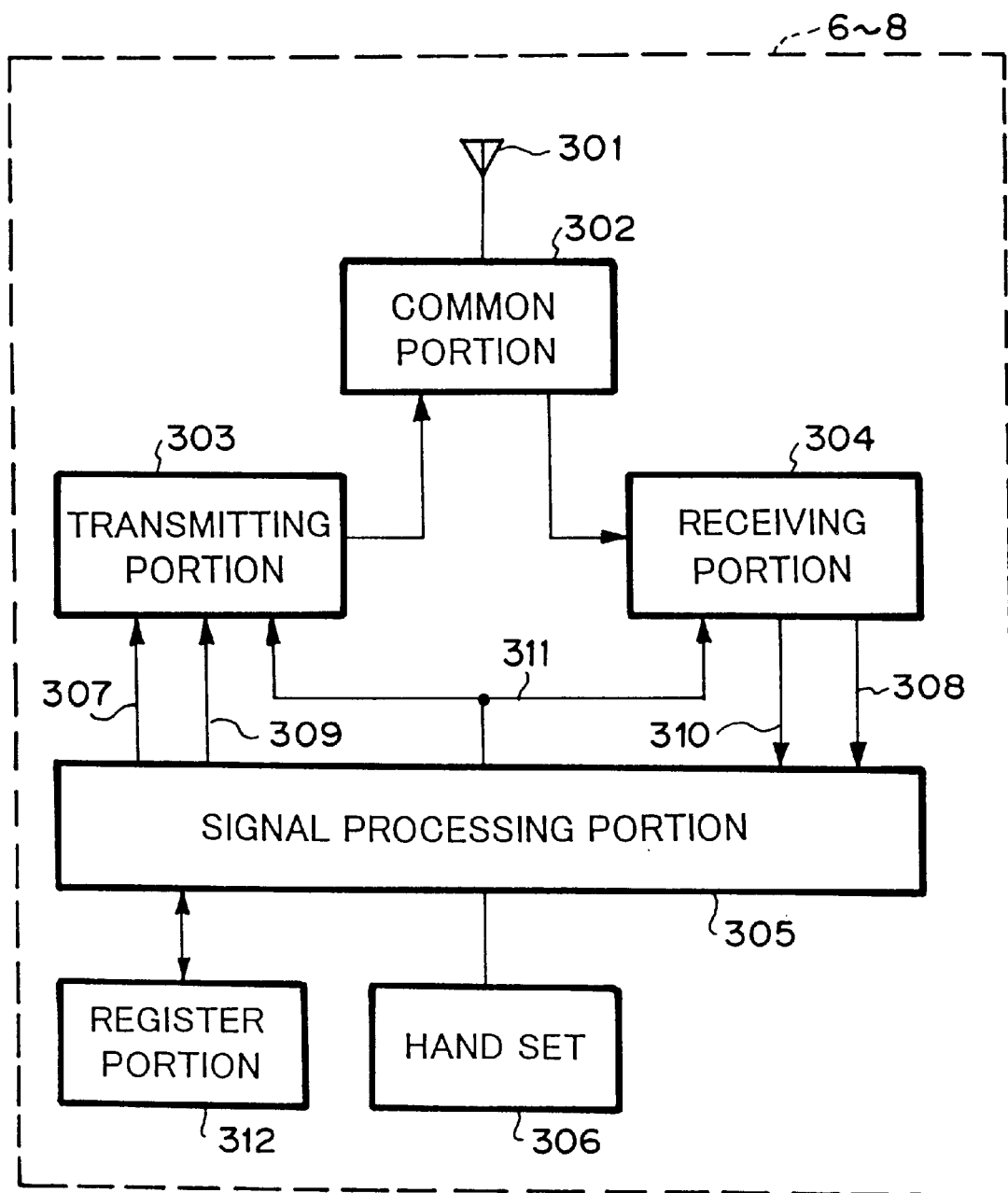
FIG. 3 is a block diagram showing the structure of a mobile station.

FIG. 3 is a block diagram showing the structures of the mobile stations 6, 7, and 8. In each of the mobile stations 6, 7, and 8, a transmitting portion 303 and a receiving portion 304 are connected to an antenna 301 through an antenna common portion 302. In addition, the transmitting portion 303 and the receiving portion 304 are connected to a signal processing portion 305. The signal processing portion 305 is connected to a register portion 312 and a hand set portion 306. The signal processing portion 305 and the transmitting portion 303 are connected with a modulation signal line 307 and a transmission activation line 309. The signal processing portion 305 and the receiving portion 304 are connected with a demodulation signal line 308 and a field information line 310. The transmitting portion 303 and the receiving portion 304 are connected with a channel designation line 311. The register portion 312 stores communication management information such as mobile station identification numbers and group communication numbers of the mobile stations.

Figure 4:
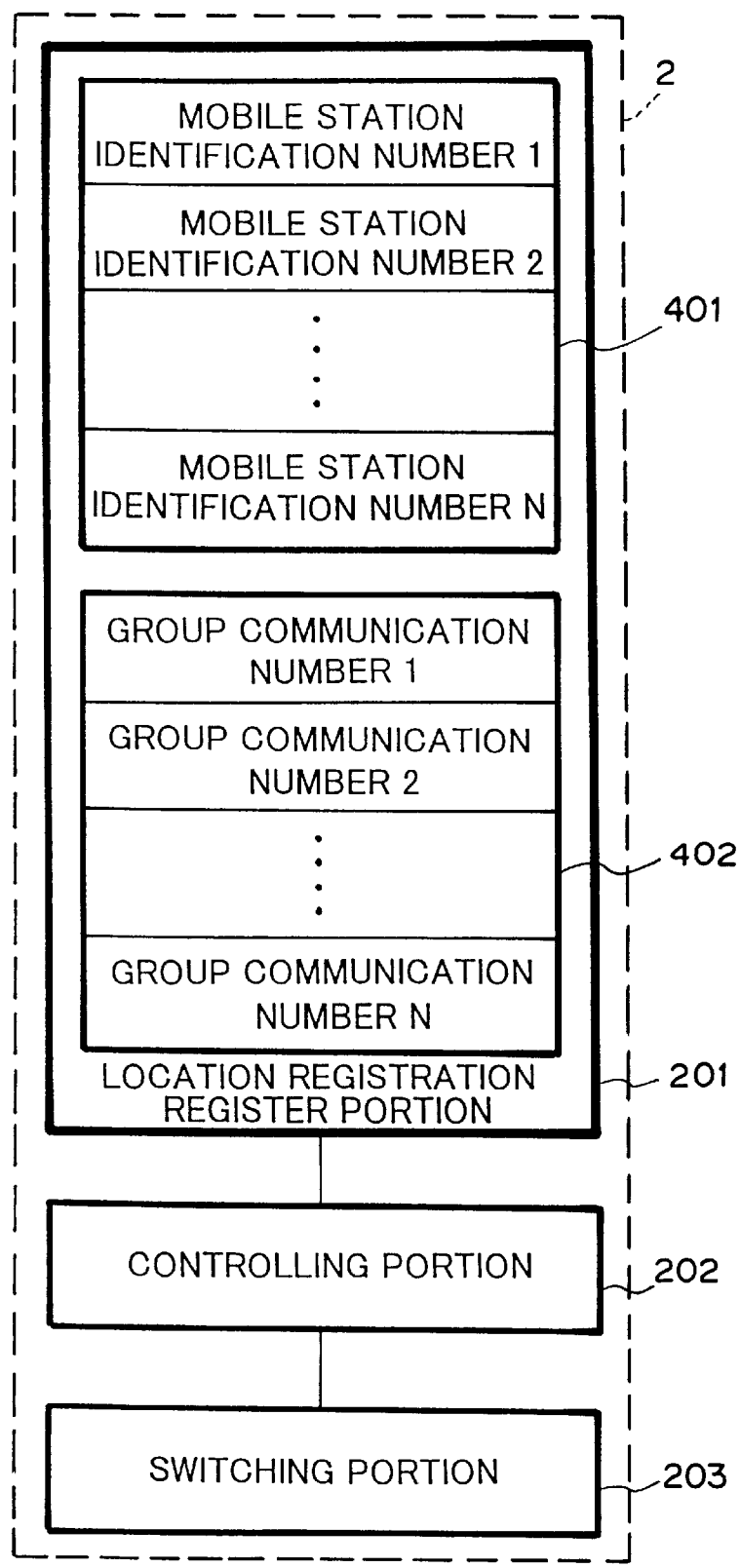
FIG. 4 is a block diagram showing the structures of a controlling portion, a switching portion, and a location registration register portion of the controlling station.

FIG. 4 is a block diagram showing the structure of the controlling station 2. The controlling station 2 comprises the location registration register portion 201, the controlling portion 202, and the switching portion 203. The location registration register portion 201 comprises a mobile station identification number management register portion 401 and a group-communication mobile-station group number management register portion 402. The mobile station number management register portion 401 has a function for retrieving a mobile station identification number corresponding to a location registration signal transmitted from a mobile station, certificating whether or not the mobile station has been registered to the system, and transmitting the result to the mobile station. On the other hand, the group-communication mobile-station group management register portion 402 has a function for determining whether or not a group communication call for a mobile station is present corresponding to a group communication number that has been registered and sending information that causes the base station to release a radio channel of a relevant radio zone to the base station when the group communication call is not present.

FIG. 5 is a flow chart for explaining the operation of the group communication system according to the embodiment of the present invention. When the power of a particular mobile station is turned on (at step S11), the location registration signal is transmitted to the mobile station identification number management register portion 401 through the control channel transmitting/receiving portion 205 of the relevant base station 3, 4, or 5, the link line 9, and the controlling portion 202 of the controlling station 2 (at step S12). The mobile station identification number management register portion 401 certificates the mobile station number (at step S13). In addition, the group-communication mobile-station group number management register portion 402 determines whether or not a group communication call is present in each radio zone (at step S13). When the mobile station is moved to a group communication radio zone (namely, the radio zone of the mobile station is handed over to another radio zone) (at step S15), the mobile station that has the group communication number transmits the location registration signal to a relevant base station in the new radio zone in the same manner as step (S16). Thus, the group communication mobile-station group number management register portion 402 determines whether or not a group communication call is present in each radio zone (at step S17).

Thus, when a radio zone in which a mobile station is not present because the radio zone of the mobile station has been handed over, the group communication mobile station group number management register portion 402 determines whether or not a group communication call is present (at step S19). Thus, the controlling station 2 can release a radio channel in a radio zone in which a mobile station is not present (at step S21). Unless the power of the mobile station is turned off, the flow returns to step S15. When the power of the mobile station is turned off (namely, the determined result at step S22 is Yes), the call is disconnected (at step S23). When the determined result at step S13 is No, the controlling station 2 rejects the call connection (at step S14). When the determined result at step S17 is No, the controlling station 2 assigns the relevant group communication channel to the new radio zone (at step S18). When the determined result at step S19 is Yes, the controlling station 2 does not release the relevant group communication channel to the radio zone that has not been handed over (at step S20).

In addition, the group number management register portion 402 collates a radio zone of which a radio channel has been released with the group communication number of the mobile station and the controlling station 2 assigns a radio channel to a group communication radio zone.

According to the present invention, when a group communication mobile station is not present in a group communication radio zone, an assigned communication channel can be released.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A group communication system, comprising:
   at least one controlling station;
   at least one base station connected to said at least one controlling station through one of a wired circuit and a radio circuit; and
   a plurality of mobile stations connected to said at least one base station,
   wherein one of said at least one controlling station and said at least one base station has means for managing group communication numbers of said mobile stations,
   wherein said mobile stations each have means for transmitting a mobile station identification number and a group communication number to said at least one base station when a radio zone of each of said mobile stations is handed over and thereby a location registration operation is performed,
   wherein one of said at least one controlling station and said at least one base station has zone area presence determining means for determining whether or not a particular mobile station is present in a radio zone to which the particular mobile station has been handed over when one of said at least one controlling station and said at least one base station receives the group communication number from the relevant mobile station, and
   wherein said at least one base station has means for releasing a communication channel when the relevant mobile station is not present in the radio zone as the determined result of said zone area presence determining means.

2. The group communication system as set forth in claim 1, further comprising:
   a link line for connecting said controlling station and said base station.

3. The group communication system as set forth in claim 1,
   wherein said controlling station is connected to a telephone unit of one of a public telephone system and a private telephone system.

4. The group communication system as set forth in claim 2,
   wherein said controlling station is connected to a telephone unit of one of a public telephone system and a private telephone system.

5. The group communication system as set forth in claim 1, wherein said at least one base station and said mobile stations are connected through radio circuits.

6. The group communication system as set forth in claim 2, wherein said at least one base station and said mobile stations are connected through radio circuits.

7. The group communication system as set forth in claim 3, wherein said at least one base station and said mobile stations are connected through radio circuits.

8. The group communication system as set forth in claim 1, wherein said at least one controlling station comprises:
   a controlling portion for connecting said at least one controlling station to said at least one base station;
   a location registration register portion for registering a location registration signal one of when the power of the relevant mobile station is turned on and when the radio zone thereof is handed over; and
   a switching portion for establishing a communication circuit between the relevant mobile station and one of said at least one base station and said at least one controlling station through one of the wired circuit and the radio circuit and a communication circuit between said mobile stations.

9. The group communication system as set forth in claim 2, wherein said at least one controlling station comprises:
   a controlling portion for connecting said at least one controlling station to said at least one base station;
   a location registration register portion for registering a location registration signal one of when the power of the relevant mobile station is turned on and when the radio zone thereof is handed over; and
   a switching portion for establishing a communication circuit between the relevant mobile station and one of said at least one base station and said at least one controlling station through one of the wired circuit and the radio circuit and a communication circuit between said mobile stations.

10. The group communication system as set forth in claim 3, wherein said at least one controlling station comprises:
    a controlling portion for connecting said at least one controlling station to said at least one base station;
    a location registration register portion for registering a location registration signal one of when the power of the relevant mobile station is turned on and when the radio zone thereof is handed over; and
    a switching portion for establishing a communication circuit between the relevant mobile station and one of said at least one base station and said at least one controlling station through one of the wired circuit and the radio circuit and a communication circuit between said mobile stations.

11. The group communication system as set forth in claim 5, wherein said at least one controlling station comprises:
    a controlling portion for connecting said at least one controlling station to said at least one base station;

a location registration register portion for registering a location registration signal one of when the power of the relevant mobile station is turned on and when the radio zone thereof is handed over; and a switching portion for establishing a communication circuit between the relevant mobile station and one of said at least one base station and said at least one controlling station through one of the wired circuit and the radio circuit and a communication circuit between said mobile stations.

12. The group communication system as set forth in claim 8, wherein said location registration register retrieves communication information of the relevant mobile station and certificates whether or not the relevant mobile station has been registered.

13. The group communication system as set forth in claim 9, wherein said location registration register retrieves communication information of the relevant mobile station and certificates whether or not the relevant mobile station has been registered.

14. The group communication system as set forth in claim 10, wherein said location registration register retrieves communication information of the relevant mobile station and certificates whether or not the relevant mobile station has been registered.

15. The group communication system as set forth in claim 11, wherein said location registration register retrieves communication information of the relevant mobile station and certificates whether or not the relevant mobile station has been registered.

16. The group communication system as set forth in claim 8, wherein said controlling portion is connected to said location registration register portion and said switching portion.

17. The group communication system as set forth in claim 9, wherein said controlling portion is connected to said location registration register portion and said switching portion.

18. The group communication system as set forth in claim 10, wherein said controlling portion is connected to said location registration register portion and said switching portion.

19. The group communication system as set forth in claim 11, wherein said controlling portion is connected to said location registration register portion and said switching portion.

20. The group communication system as set forth in claim 12, wherein said controlling portion is connected to said location registration register portion and said switching portion.

21. The group communication system as set forth in claim 13, wherein said controlling portion is connected to said location registration register portion and said switching portion.

22. The communication system as set forth in claim 14, wherein said controlling portion is connected to said location registration register portion and said switching portion.

23. The group communication system as set forth in claim 15, wherein said controlling portion is connected to said location registration register portion and said switching portion.

24. The group communication system as set forth in claim 8, wherein said at least one base station comprises:

a controlling portion connected to said controlling portion of said at least one controlling station;

a control channel transmitting/receiving portion connected to said location registration register portion of said at least one controlling station; and a transmitting/receiving unit with a plurality of communication channels.

25. The group communication system as set forth in claim 9, wherein said at least one base station comprises:

a controlling portion connected to said controlling portion of said at least one controlling station;

a control channel transmitting/receiving portion connected to said location registration register portion of said at least one controlling station; and a transmitting/receiving unit with a plurality of communication channels.

26. The group communication system as set forth in claim 10, wherein said at least one base station comprises:

a controlling portion connected to said controlling portion of said at least one controlling station;

a control channel transmitting/receiving portion connected to said location registration register portion of said at least one controlling station; and a transmitting/receiving unit with a plurality of communication channels.

27. The group communication system as set forth in claim 11, wherein said at least one base station comprises:

a controlling portion connected to said controlling portion of said at least one controlling station;

a control channel transmitting/receiving portion connected to said location registration register portion of said at least one controlling station; and a transmitting/receiving unit with a plurality of communication channels.

28. The group communication system as set forth in claim 12, wherein said at least one base station comprises:

a controlling portion connected to said controlling portion of said at least one controlling station;

a control channel transmitting/receiving portion connected to said location registration register portion of said at least one controlling station; and a transmitting/receiving unit with a plurality of communication channels.

29. The group communication system as set forth in claim 13, wherein said at least one base station comprises:

a controlling portion connected to said controlling portion of said at least one controlling station;

a control channel transmitting/receiving portion connected to said location registration register portion of said at least one controlling station; and a transmitting/receiving unit with a plurality of communication channels.

30. The group communication system as set forth in claim 14, wherein said at least one base station comprises:
- a controlling portion connected to said controlling portion of said at least one controlling station;
- a control channel transmitting/receiving portion connected to said location registration register portion of said at least one controlling station; and
- a transmitting/receiving unit with a plurality of communication channels.

31. The group communication system as set forth in claim 15, wherein said at least one base station comprises:
- a controlling portion connected to said controlling portion of said at least one controlling station;
- a control channel transmitting/receiving portion connected to said location registration register portion of said at least one controlling station; and
- a transmitting/receiving unit with a plurality of communication channels.

32. The group communication system as set forth in claim 16, wherein said at least one base station comprises:
- a controlling portion connected to said controlling portion of said at least one controlling station;
- a control channel transmitting/receiving portion connected to said location registration register portion of said at least one controlling station; and
- a transmitting/receiving unit with a plurality of communication channels.

33. The group communication system as set forth in claim 24, wherein said control channel transmitting/receiving unit controls said mobile stations.

34. The group communication system as set forth in claim 25, wherein said control channel transmitting/receiving unit controls said mobile stations.

35. The group communication system as set forth in claim 26, wherein said control channel transmitting/receiving unit controls said mobile stations.

36. The group communication system as set forth in claim 27, wherein said control channel transmitting/receiving unit controls said mobile stations.

37. The group communication system as set forth in claim 28, wherein said control channel transmitting/receiving unit controls said mobile stations.

38. The group communication system as set forth in claim 29, wherein said control channel transmitting/receiving unit controls said mobile stations.

39. The group communication system as set forth in claim 30, wherein said control channel transmitting/receiving unit controls said mobile stations.

40. The group communication system as set forth in claim 31, wherein said control channel transmitting/receiving unit controls said mobile stations.

41. The group communication system as set forth in claim 32, wherein said control channel transmitting/receiving unit controls said mobile stations.

* * * * *